(12) United States Patent
Field

(10) Patent No.: US 10,796,539 B2
(45) Date of Patent: Oct. 6, 2020

(54) VISUALLY-IMPAIRED-ACCESSIBLE BUILDING SAFETY SYSTEM

(71) Applicant: Siemens Industry, Inc., Alpharetta, GA (US)

(72) Inventor: Leslie A. Field, Fair Lawn, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 58 days.

(21) Appl. No.: 15/899,994

(22) Filed: Feb. 20, 2018

(65) Prior Publication Data

US 2018/0174407 A1    Jun. 21, 2018

Related U.S. Application Data

(63) Continuation of application No. PCT/US2017/051246, filed on Sep. 13, 2017, and a
(Continued)

(51) Int. Cl.
*G10L 15/22*  (2006.01)
*G10L 17/22*  (2013.01)
(Continued)

(52) U.S. Cl.
CPC .............. *G08B 3/10* (2013.01); *G08B 7/066* (2013.01); *G08B 21/02* (2013.01); *G08B 25/016* (2013.01); *G10L 15/08* (2013.01); *G10L 15/22* (2013.01); *G10L 17/22* (2013.01); *G10L 25/51* (2013.01); *G06F 3/167* (2013.01); *G10L 2015/223* (2013.01)

(58) Field of Classification Search
CPC . G10L 15/22; G10L 2015/223; G10L 17/005; G01C 21/3608; G01C 21/3629; G01B 25/001; G01B 25/008; G01B 25/012; G08B 7/06; G08B 7/066; G08B 21/02
USPC .... 704/231, 251, 270, 270.1, 271, 273, 274, 704/275, 246
See application file for complete search history.

(56) References Cited

U.S. PATENT DOCUMENTS

| | | | | |
|---|---|---|---|---|
| 6,263,311 | B1 * | 7/2001 | Dildy ...................... | G10L 17/00 704/247 |
| 6,678,612 | B1 * | 1/2004 | Khawam .............. | G08B 25/016 340/426.15 |

(Continued)

FOREIGN PATENT DOCUMENTS

| JP | 2007018229 A | 1/2007 |
|---|---|---|
| WO | 2015183427 A1 | 12/2015 |

OTHER PUBLICATIONS

PCT International Search Report and Written Opinion of International Searching Authority dated Jan. 5, 2018 corresponding to PCT International Application No. PCT/US2017/051246 filed Sep. 13, 2017.

(Continued)

*Primary Examiner* — Martin Lerner

(57) ABSTRACT

Building safety systems, methods, and mediums are provided. A method includes receiving a voice input by the building safety system. The method includes receiving voice data produced by a speech recognition process performed on the voice input. The method includes determining a response to the voice input based on the voice data. The method includes producing the response by the building safety system.

20 Claims, 5 Drawing Sheets

Related U.S. Application Data continuation of application No. 15/265,546, filed on Sep. 14, 2016, now Pat. No. 9,934,658.

(51) Int. Cl.

| | |
|---|---|
| *G08B 7/06* | (2006.01) |
| *G08B 21/02* | (2006.01) |
| *G08B 3/10* | (2006.01) |
| *G10L 15/08* | (2006.01) |
| *G08B 25/01* | (2006.01) |
| *G10L 25/51* | (2013.01) |
| *G06F 3/16* | (2006.01) |

(56) References Cited

U.S. PATENT DOCUMENTS

| | | | | |
|---|---|---|---|---|
| 7,752,047 | B2* | 7/2010 | Morris | G10L 15/26 |
| | | | | 704/251 |
| 8,265,938 | B1* | 9/2012 | Verna | G08B 27/006 |
| | | | | 704/274 |
| 9,754,466 | B2* | 9/2017 | Simmons | G01C 21/206 |
| 9,934,658 | B1* | 4/2018 | Field | G06F 3/16 |
| 2006/0120516 | A1* | 6/2006 | Armbruster | G08B 27/001 |
| | | | | 379/37 |
| 2007/0198849 | A1* | 8/2007 | Mozer | G10L 17/00 |
| | | | | 713/186 |
| 2008/0140400 | A1* | 6/2008 | Blass | G10L 15/22 |
| | | | | 704/246 |
| 2008/0278007 | A1* | 11/2008 | Moore | G10L 15/26 |
| | | | | 307/116 |
| 2013/0181834 | A1 | 7/2013 | Bentley et al. | |
| 2013/0242074 | A1 | 9/2013 | Sekiguchi et al. | |
| 2015/0029019 | A1* | 1/2015 | Matsuoka | G08B 25/001 |
| | | | | 340/501 |
| 2015/0364142 | A1* | 12/2015 | Sankaranarayanan | G10L 17/22 |
| | | | | 704/275 |
| 2016/0044482 | A1* | 2/2016 | Stephens, Jr. | G08B 21/0269 |
| | | | | 455/404.2 |
| 2016/0080165 | A1* | 3/2016 | Ehsani | G10L 21/06 |
| | | | | 704/9 |
| 2016/0241818 | A1 | 8/2016 | Palanisamy et al. | |
| 2017/0030720 | A1* | 2/2017 | Moore | G01C 21/206 |

OTHER PUBLICATIONS

PCT Search Report dated Apr. 20, 2018, for PCT Application No. PCT/US2017/051246, 26 pages.

\* cited by examiner

VISUALLY-IMPAIRED-ACCESSIBLE BUILDING SAFETY SYSTEM

RELATED APPLICATIONS

This application is a continuation of application Ser. No. 15/265,546, filed Sep. 14, 2016, now granted as U.S. Pat. No. 9,934,658, issued Apr. 3, 2018, and claims priority to PCT/US2017/051246, filed Sep. 13, 2017.

TECHNICAL FIELD

The present disclosure is directed, in general, to building safety and automation systems and, more particularly, to building safety systems that accommodate the visually impaired and other people.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. These building automation systems typically may have one or more centralized control stations from which system data may be monitored and various aspects of system operation may be controlled and/or monitored. A building can have one or more fire safety control panels as part of the fire safety system of the building.

To allow for monitoring and control of the dispersed control system elements, building automation systems often employ multi-level communication networks to communicate operational and/or alarm information between operating elements, such as sensors (such as smoke detectors) and actuators (such as strobes or other notification appliances), a fire safety control panel, and a centralized monitoring system.

Fire safety systems can play an integral part in building automation systems. A typical fire safety system uses automated smoke and heat detectors, and relies on manual "pull stations" for individuals to activate the fire safety system. Pull stations are generally required to have braille markings for the use of blind person, but if those persons are not familiar with a building, it can be very difficult for a visually-impaired individual to locate a pull station.

Moreover, if smoke develops in area of a building or residence with a disarmed or non-functioning detector, a person who is not blind may have difficulty locating and activating a pull station to cause the fire safety system to notify an emergency responder.

Furthermore, other non-fire emergency events (such as a terrorist in a building) may cause a person to want to locate a pull station to signal the fire safety system or building automation system to notify an emergency responder.

Accordingly, there is a need for an improvement in pull stations or other devices in a fire safety system or building automation system to enable a visually-impaired person to signal such system of an emergency event in order to notify an emergency responder.

SUMMARY OF THE DISCLOSURE

Various disclosed embodiments relate to systems and methods for a speech-recognition-enabled building safety system (which may be a fire safety system, security system, a combination thereof or other subsystem of a building automation system). A method includes receiving a voice input by the building safety system. The method includes receiving voice data produced by a speech recognition process performed on the voice input. The method includes determining a response to the voice input based on the voice data. The method includes producing the response by the building safety system.

A building safety system includes a safety control panel and a plurality of building safety devices in communication with the safety control panel. The building safety system configured to receive a voice input, receive voice data produced by a speech recognition process performed on the voice input, determine a response to the voice input based on the voice data, and produce the response.

In various embodiments, the building management system also determines whether the voice data corresponds to an authorized user and wherein the building safety system produces the response when the voice data is determined to correspond to the authorized user. In various embodiments, the speech recognition process is performed by a mobile device, and the voice data is transmitted to the building safety system. In various embodiments, determining a response to the voice input includes determining whether the voice input is one of a request for directions to a pull station, a distress sound, or a distress word. In various embodiments, producing the response includes activating a notification device controlled by the building safety system to signal an alarm after determining the voice input is one of a request for directions to a pull station, a distress sound or a distress word. In various embodiments, wherein the building safety system includes a plurality of building safety devices each having a speaker, and after determining the voice input is one of a distress sound or a distress word, the building safety system produces an audible response via the speaker of a first of the building safety devices, the audible response being a phrase to prompt an individual to confirm an emergency event is occurring. In various embodiments, the voice input is received by a building safety device implemented in one of a pull station, a smoke detector, a heat detector, a notification device, an emergency light, an exit sign, or a public-address speaker. In various embodiments, the response is produced by a building safety device implemented in one of a pull station, a smoke detector, a heat detector, a notification device, an emergency light, an exit sign, or a public-address speaker. In various embodiments, the building management system also determines a location of an individual that transmitted the voice input relative to a building safety device of the building safety system, and the response is audible directions to the pull station or the exit relative to the location of the individual. In various embodiments, the building safety system has a plurality of building safety devices, each having a microphone, the voice input is received by one of the building safety devices, and the speech recognition process is performed by a safety control panel in communication with the one building safety device. In various embodiments, the building safety system has a plurality of building safety devices in communication with a safety control panel; each building safety device having a microphone and a speech recognition circuit; and the speech recognition process is performed by one of the building safety devices.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure include systems and methods that aid visually-impaired persons, and others, to easily interact with a building safety system. In particular, disclosed embodiments employ user voice recognition and other input techniques in fire safety devices (such as detection devices, emergency activation devices like pull stations, and alarm notification devices, like strobes or horns) or other building devices (such as public speakers, thermostats, and security cameras) to receive input from a visually impaired person and to guide such person to an exit or to an emergency activation device like a fire alarm pull station to enable such person to signal the building safety system to notify an emergency responder of the emergency event.

Figure 1:
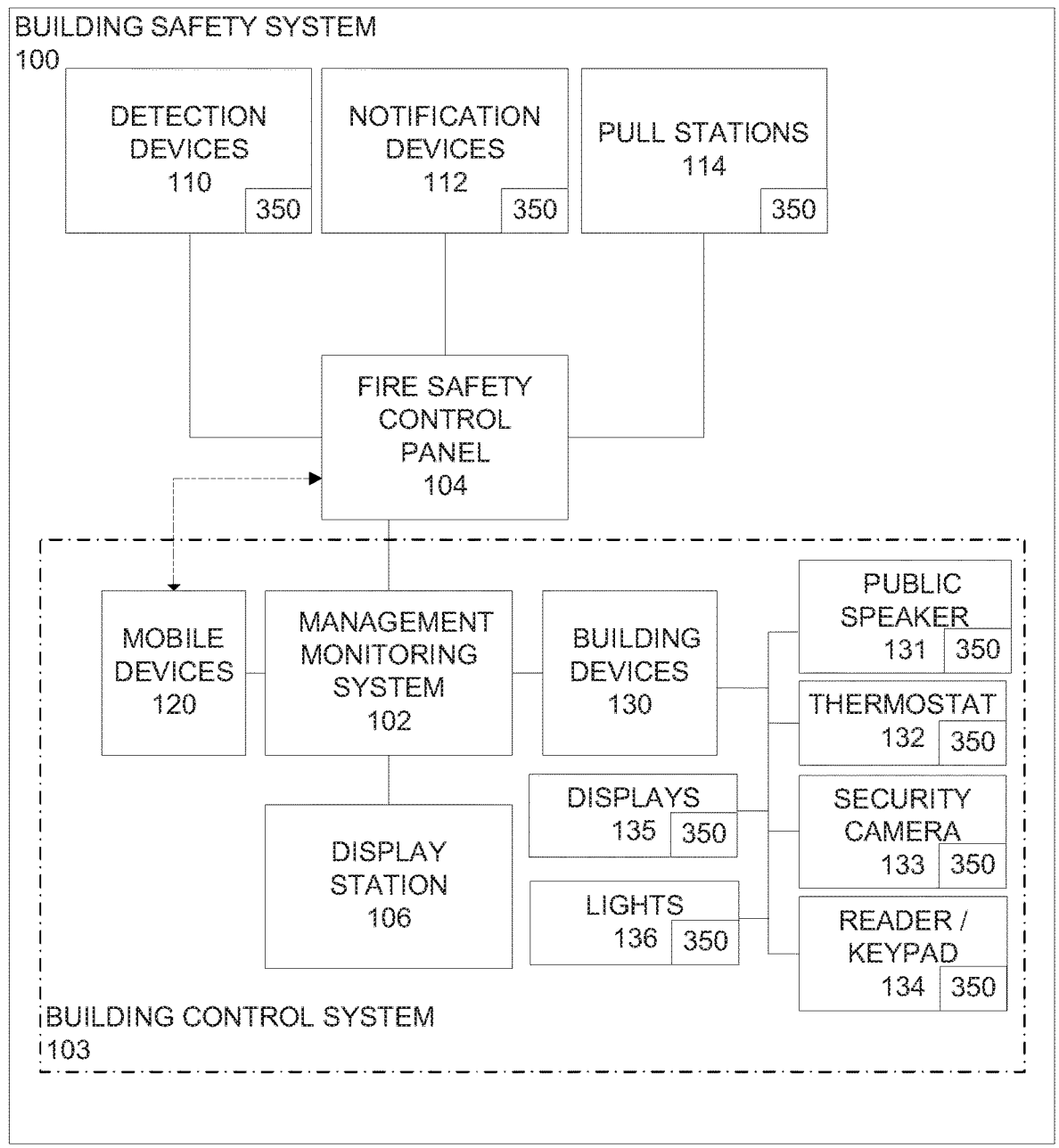
FIG. 1 illustrates a block diagram of a building safety system in which various embodiments are implemented.

FIG. 1 illustrates a block diagram of a building safety system 100 in which various embodiments are implemented. In this illustrative embodiment, the building safety system 100 includes a building control system 103 that performs overall building management functions that can include safety controls, lighting controls, HVAC controls, and other building management functions. Building control system 103 can be implemented by one or more date processing systems, as described herein, and any suitable controllers, sensors, actuators, and other devices to perform building management functions not discussed in detail herein. Building control system 103 may include a central or management monitoring system 102 and/or one or more display stations 106, each of which can be implemented as a data processing system, mobile device, or other device configured to communicate with building control system 103. Each of the connections shown in the block diagram of FIG. 1 can include any number of suitable connections, such as wired, wireless, or fiber optic links, and can be implemented as a number of different types of networks, such as, for example, the internet, a local area network (LAN), or a wide area network (WAN).

The building safety system 100 can include a fire safety control panel 104, or several of them. Fire safety control panel 104 may be implemented as a data processing system as described herein, using one or more controllers and storage devices, or other components. Fire safety control panel 104 communicates with the various devices described herein, and in specific embodiments is implemented as a fire control panel. Fire safety control panel 104 is configured to perform processes as described in more detail below.

Fire safety control panel 104 communicates with fire safety devices, including detection devices 110, notification devices 112, or pull stations 114. Detection devices 110 can include smoke detectors, heat detectors, motion detectors, voice/sound detectors, cameras, infrared or motion detectors, and other detection devices as described herein or known to those of skill in the art. Notification devices 112 can include loudspeakers, horns, sirens, strobes or other lights, display panels, signs, and other notification devices as described herein or known to those of skill in the art, including remote annunciators and dialers to make automated telephone calls. Pull stations 114 can include any means of manually activating an emergency event, including mechanical fire pull stations, panic buttons, or other emergency activation devices.

In various embodiments, the management monitoring system 102 can also communicate with mobile devices 120, which may or may not be considered a part of the building safety system 100. For example, as described in more detail below, the management monitoring system 102 (or detection devices 110) may include wireless access points or network connections that can communicate with an individual's mobile device to perform functions as described herein. Management monitoring system 102 can communicate with building devices 130, which can include (but are not limited to) such devices as public speaker 131, thermostat 132, security camera 133, and security access readers/keypads 134. In accordance with embodiments disclosed herein, the management monitoring system 102 may also communicate with displays 135 and lights 136 that have wired or wireless network communication (including over power lines) with the management monitoring system.

According to disclosed embodiments, different types of devices are integrated into a common unit. For example, a single unit may house notification devices 112 such as a strobe light and loudspeaker, in combination with fire safety detection devices 110 such as heat and smoke detectors as described herein. In various embodiments, the control logic for various detection or notification functions is housed in the device itself, while in other embodiments, the device includes the input or output device and the control logic is implemented by the fire safety control panel 104.

For clarity in the description herein, a building safety device includes a fire safety device 110, 112, and 114 and/or other building device 131, 132, 133, 134, 135 or 136 that has a voice activated emergency event interface 350 as further described in accordance with the embodiments disclosed herein.

Figure 2:
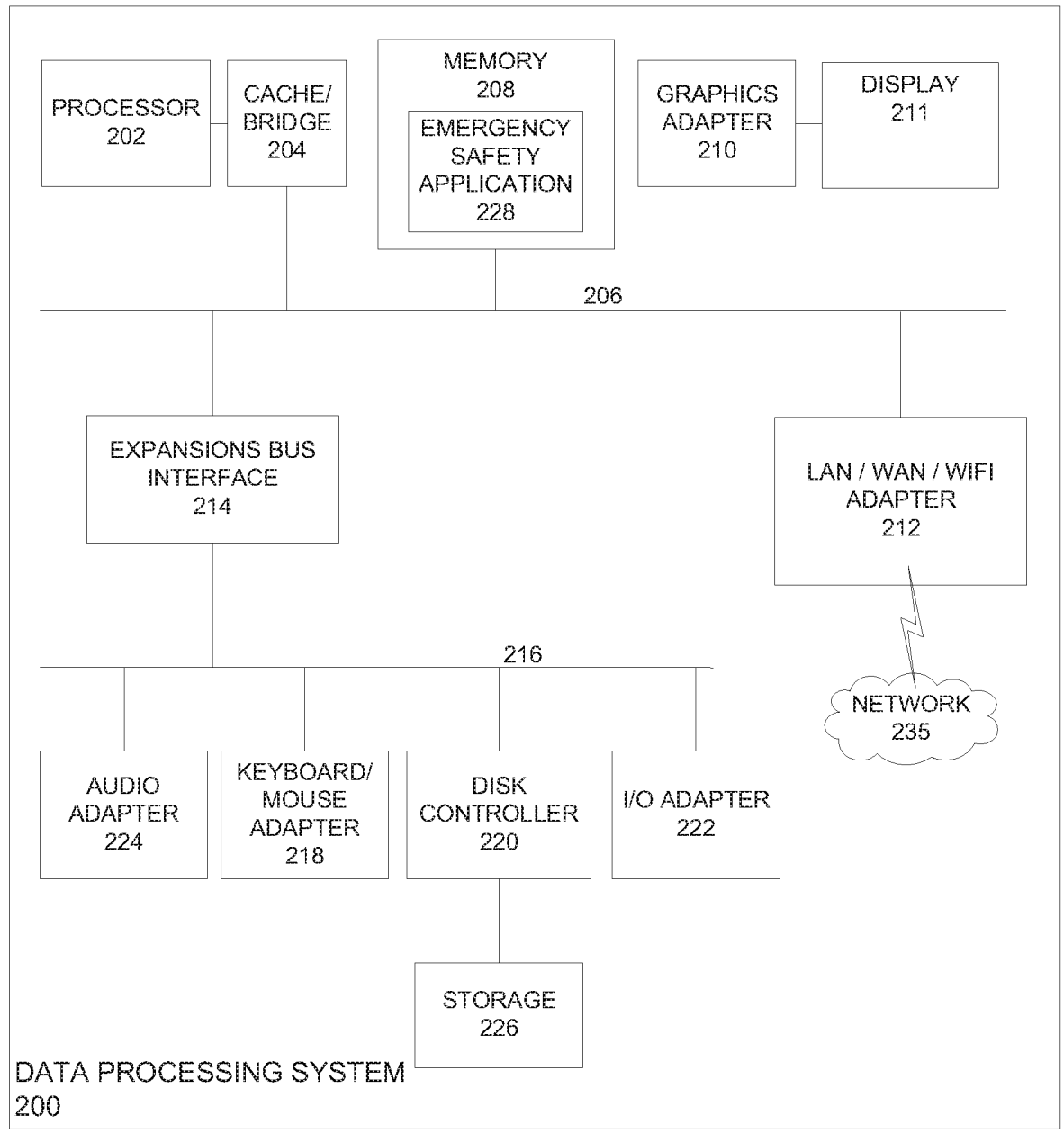
FIG. 2 illustrates a block diagram of a data processing system in which various embodiments of the present disclosure are implemented.

FIG. 2 depicts a block diagram of a data processing system 200 in which various embodiments are implemented. The data processing system 200 is an example of a system that can be used to implement building control system 103 (or any management monitoring system 102 or display station 106 thereof) or fire safety control panel 104. The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211.

Other peripherals, such as a local area network (LAN)/Wide Area Network/Wireless (e.g. Wi-Fi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may modified or created in accordance with the present disclosure as described, for example, to implement virtual demand auditing of one or more devices in a building.

LAN/WAN/Wireless adapter 212 may be connected to a network 235, such as for example, communicating between the systems, panels, and devices described herein. As further explained below, the network 235 may be any public or private data processing system network or combination of networks, as known to those of skill in the art, including the Internet. Data processing system 200 may communicate over network 235 to one or more computers or mobile devices which are also not part of data processing system 200, but may be implemented, for example, as a separate data processing system 200.

According to disclosed embodiments, a voice activated emergency event interface 350 is employed in a building safety device 110, 112, 114, 131, 132, 133, 134, 135 or 136 to provide a speech recognition (SR)-capable building safety device, such as an SR-capable pull station, that can be located and activated by a visually impaired person. Such an SR-capable building safety device can function to detect an emergency event based on voice recognition techniques described herein and to activate the signaling of the emergency event to the fire safety control panel 104 or building control system 103, which in conventional fire safety systems required manual activation of a standard pull station. The SR-capable building safety device can be used throughout a building or common space, and can be activated by either voice command, as described in more detail below, or by physical activation. As used herein, an "alarm condition" refers to a condition detected as described herein for which the building control system, fire safety control panel, or other building safety device provides a response such as sounding an alarm, or notifying a responder or others within a building or outside the building via network 235.

The SR-capable building safety device as disclosed herein can help a person locate the pull station or building safety device by: detecting the person through the voice activated emergency event interface 350; determining the position of the detected person relative to the pull station or building safety device via motion sensors employed in or integrated with such pull station or building safety device; and providing corresponding audio directions to such pull station or building safety device.

Figure 3:
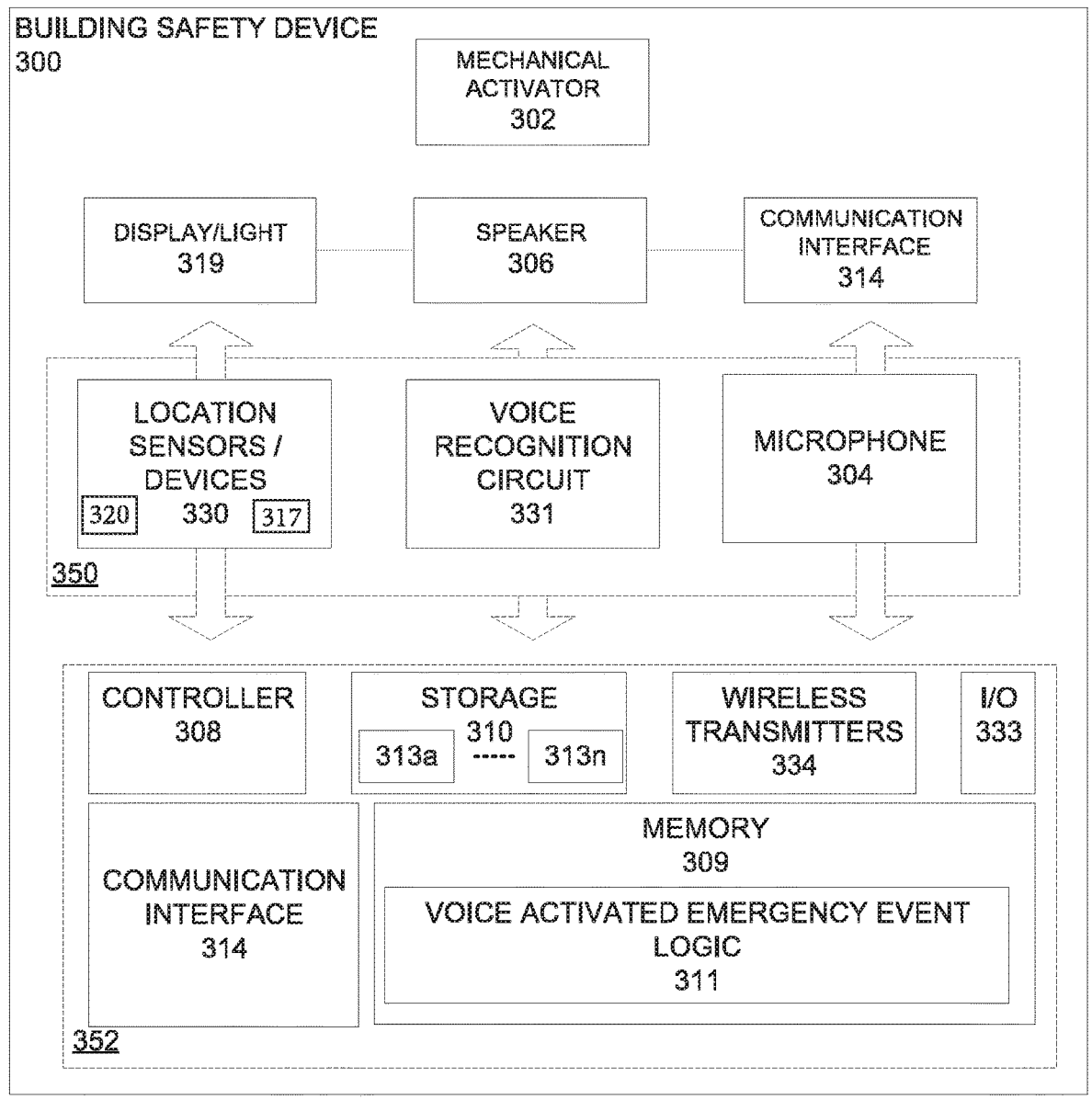
FIG. 3 illustrates a block diagram of a building safety device in accordance with disclosed embodiments.

FIG. 3 illustrates a block diagram of a building safety device 300 in accordance with disclosed embodiments, that can be used to implement an SR-capable pull station or other SR-capable building safety device as described herein. Note that not all of the elements described below are necessary for every implementation, and that a similar device can be used in the building safety device for SR or notification purposes without being implemented as a pull station or including a mechanical activator.

Building safety device 300 can include a mechanical activator 302, such as a level or switch, that operates as a conventional pull station to manually indicate an alarm condition to the safety control panel.

Building safety device 300 can include a communication interface 314 that communicates with the fire safety control panel 104 or other devices as described herein, to send and receive the signals as described. Communication interface 314 can be an interface to a wired or wireless network, one or more analog or digital connections, a Bluetooth device, or otherwise. Communications interface 314 can also include such features as a Bluetooth beacon, Wi-Fi access point, global positioning system received, or others, and can thereby assist in providing location services to other devices. Communications interface 314 can operate in a real-time and continuous manner so that as the person is moving according to the directions of the system, the system is monitoring the movements of the person, and verbally correcting and directing the person towards the pull station and then out of the building.

Standard pull stations typically have a mechanical activator 302 coupled to a discrete output wired connection to a fire safety control panel to signal when the mechanical activator 302 is manually activated. However, such standard pull stations may be modified to include a voice activated emergency interface 350 and a control circuit 352 to provide a building safety device 300 as described in the disclosed embodiments herein. In particular, the control circuit 352 of a building safety device 300 may include a controller 308, memory 309 for storing voice activated emergency event logic 311, storage 310 that may store user voice samples or patterns 313a-313n, I/O devices 333 and/or wireless transmitters 334 for controlling the operation of the building safety device 300, storing any data, and performing functions as described herein. In some embodiments, control circuit 352 can also communicate with external systems, such as cloud-based systems, for monitoring, control, or analysis purposes.

The voice activated emergency event interface 350 of the building safety device 300 may include a microphone 304, a voice recognition circuit 331, and one or more location sensors or devices 330. The microphone 304 is preferably tuned to detect audio from an individual at a predetermined distance from the building safety device 300 as installed in the building (i.e., within 500 feet) such that the individual is in audio range of at least one building safety device 300 while in the building. The voice recognition circuit 331 may include one or more noise cancellation filters that may be selectively adjusted by a technician to define background noise within proximity of the building safety device 300 that is filtered out by the voice recognition circuit 311 when in operation to enable the building safety device 300 to identify the voice of an individual in accordance with the embodiments disclosed herein.

The location sensors or devices 330 may include an infrared detector or array, a heat detector or array, or other detector that can detect conditions proximate to the building safety device 300 for determining the presence of an individual and to derive the direction of movement of the individual relative to the building safety device 300. In other embodiments, the location sensors or devices 330 may also include a camera 317 that can capture images of an individual proximate to the building safety device 300 for deriving the presence and direction of movement of such individual relative to the building safety device 300. In further embodiments, the location sensors or devices may include another standard motion sensor 320 that may be controlled via controller 308 to detect the presence of and direction of movement of an individual within a distance of the building safety device 300 in which the microphone 304 can detect the voice of the individual. For example, in various embodiments, location sensors/devices 330 can include devices such as an ultrasonic ranging module, a sonic rangefinder, laser rangefinder, radar distance measurement, pulse repetition frequency devices, GPS devices, or others, which can be used to help the detect a person and provide the ability for the system to provide directions to the individual.

As previously noted, the voice activated emergency event interface 350 having the microphone 304, voice recognition circuit 331 and location sensors/devices 330 can be installed in any fire safety device 110, 112, and 114 and/or other building device 131, 132, 133, and 134 to implement a building safety device 300 in accordance with the disclosed embodiments. In one embodiment, the controller 308 may send any audio detected by the voice recognition circuit 331 of a building safety device 300 to the emergency safety application 228 for processing to recognize an individual identifying an emergency event and provide audio or visual notification feedback or guidance to the individual via notification devices 112, displays 135, or light 136 in proximity to the building device 300 that detected the audio from the individual. In other embodiments, the voice activated emergency event interface 350 of the building safety device 300 may include a speaker 306 for providing audio notification feedback or guidance generated by the controller 308 when processing outputs from the voice recognition circuit 331 or received via the communication interface 314 from the emergency safety application 228. Speaker 306 can be a loudspeaker, siren, or other audible notification device.

Building safety device 300 can also include other notification devices such as a display/light 319 to provide direct visual notifications to individuals. For example, display/light 319 can be an LCD display, a strobe light, or other visual notification device. Note that while audio or visual notification are referred to in the alternative herein, they will often be employed at the same time, and audio notification can be preferred in implementations that are used to assist the visually-impaired.

The various components can all be controlled by the controller 308, which can communicate with the safety control panel or other devices over communication interface 314.

While in specific implementations, the building safety device 300 is implemented as an SR-capable pull station, in other embodiments, the building safety device 300 is implemented as a stand-alone safety system, without a mechanical pull-station function, to operate as described herein. The speech-recognition functions can be performed in the building safety device itself, in some embodiments, or the audio data can be transmitted to the building management system or safety control panel for processing and speech recognition.

According to disclosed embodiments, a building safety device 300 can perform speech-recognition functions by "listening" for specific words or voices using the microphone and the voice recognition circuit. When the words or voices are detected, the building safety device 300 alone or in cooperation with the emergency safety application 228 of the building safety system 100 can respond with assistance, activate an alarm condition, or otherwise, as described herein. For example, the building safety device 300 may detect a person stating "Fire locate pull station" and respond with an audio or visual indication of where the nearest fire safety device or pull station is located. In various embodiments, the nearest fire safety device 300 may not be the same as the nearest pull station, so if a first fire safety device "hears" such key words, the individual may be directed to a different fire safety device or pull station, such as by audibly sound, "a pull station is located 15 feet down the hallway to the right. An exit is 20 feet down the hallway to your right."

In various embodiments, voice samples or patterns 313a-313n for authorized individuals can be stored in the building safety device, the building management system, or safety control panel (collectively, the "system"). Authorized individuals may be able to activate an alarm condition just by speaking when the system verifies their voice against the stored voice samples or patterns 313a-313n. For example, if the system detects the words "activate fire alarm," it may first determine if the speaker is an authorized individual. If the speaker is an authorized individual, the system may activate the alarm condition based on the spoken instructions alone. If the speaker is not an authorized individual, the system may instead use audio or visual indicators to direct the individual to the nearest pull station where the alarm condition can be manually activated.

In some embodiments, the building safety device 300 can wirelessly communicate with a mobile device, such as an individual's mobile phone via a secondary communication interface 314, using Bluetooth, Wi-Fi, or other wireless protocols. In such embodiments, the mobile device may perform speech recognition functions and communicate the result to the building safety device. For example, a visually-impaired user may activate an application ("App") on their mobile device requesting the location of the nearest pull station. The App communicates this request from the mobile device to the building safety device, and the system responds by directing the individual to the nearest pull station.

In some embodiments, the system can automatically identify the physical location of an individual using infrared detectors, the microphone, wireless technology that identifies the individual's mobile device, or otherwise, such as by location sensors/devices 330 as disclosed herein. Automatically identifying the physical location of the individual helps enable the system to provide directions to the individual.

In such cases, the system can provide audible directions, using the speaker 306 of the applicable building safety device 300 or other speaker under the control of the system (i.e., public speaker 131 or a speaker employed in any notification device 112), to guide the individual to the pull station, exit, or other location the individual is seeking. In cases where the system can actively track the location of the user, the system can also give audible feedback to the individual such as "you are moving in the right direction" or "you are going the wrong way." The system can store data such as building plans, building planning systems, and locations within the building of exits, pull stations, and other destinations to automatically provide direction to individuals.

In some embodiments, when an alarm condition is activated and the system knows the location of an individual in the building, the system can alert emergency personnel of the individual's location so that assistance can be provided.

In some embodiments, the audible notification can include a high pitch sound and/or low soft tone to aid service animals to locate pull stations or other destinations.

The building safety device 300 can be implemented in any number of fire safety devices and/or other building devices common to buildings, such as pull stations, exit signs, fire/smoke/heat detectors, strobe lights, thermostats or other building controls, or otherwise, to leverage the existing infrastructure of the building and to provide the capabilities described herein to every part of the building.

Figure 4:
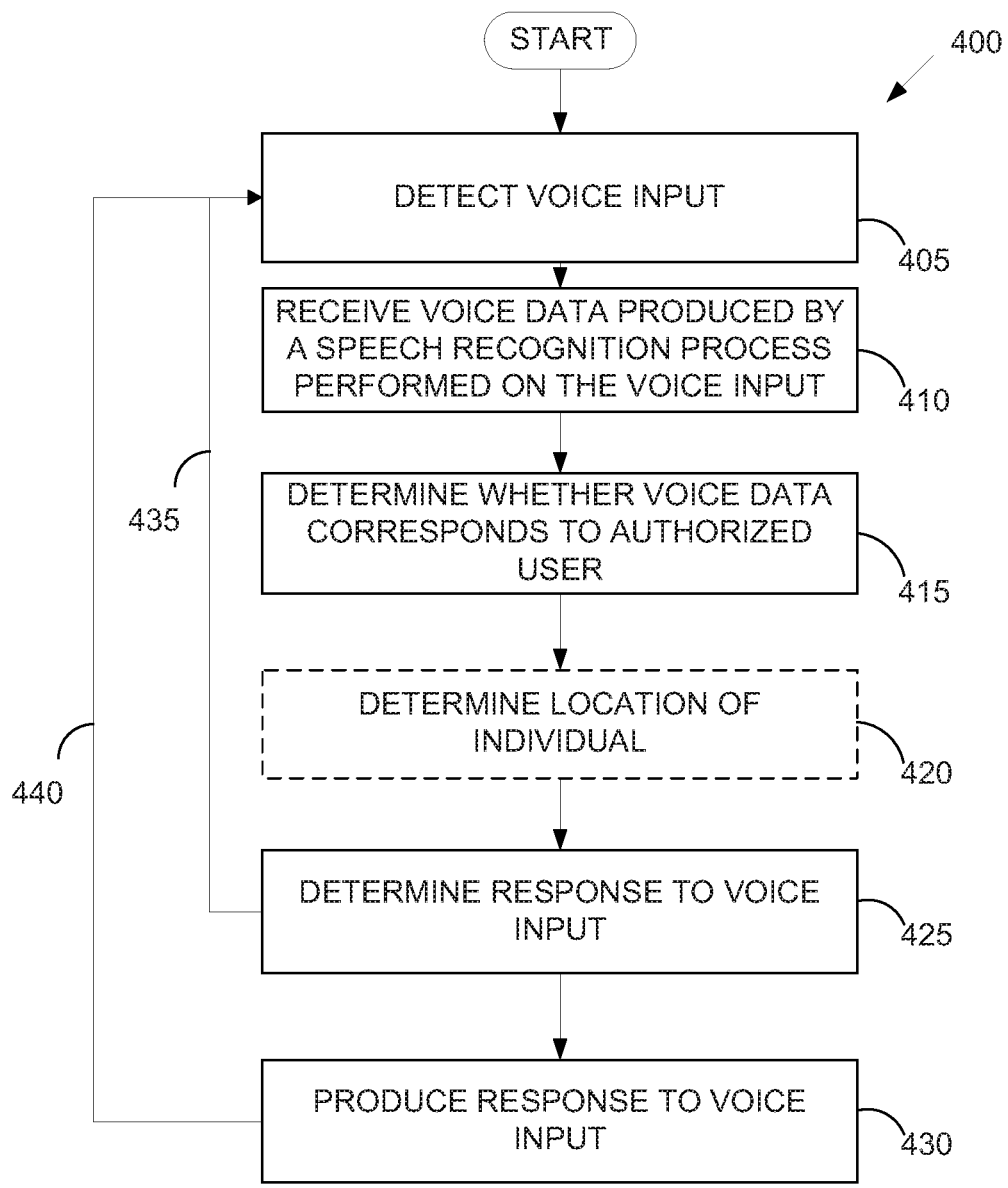
FIG. 4 illustrates a flowchart of a process in accordance with disclosed embodiments.

FIG. 4 depicts a flowchart of a process 400 in accordance with disclosed embodiments. This process may be performed, for example, by one or more building safety systems, such as building safety system 100, one or more building safety devices such as building safety device 300, or one or more data processing systems, such as, for example, the data processing system 200, configured to perform acts described below, a mobile device 120, any of which, or any combination of which, are referred to in the singular as "the system." The process may be implemented by executable instructions stored in a non-transitory computer-readable medium that cause one or more elements of the system to perform such a process. For example, the emergency safety application 228 may comprise the executable instructions to cause one or more data processing systems to perform such a process.

The process begins with the system detecting a voice input from an individual (405). In various embodiments, the voice input is received by the microphone 304 with interface with the voice recognition circuit (331) of a building safety device 300. In other embodiments, the voice input can be received by the individual's mobile device. The voice input can be, for example, a request for directions to a pull station, a command to activate an alarm, a sound recognizable by the voice recognition circuit 331 as a distress sound from an individual (such as a scream), a word recognizable by the voice recognition circuit 331 as a distress word from an individual (such as the word "Fire" or "Help") in any known languages, or otherwise.

The system receives voice data produced by a speech recognition process performed on the voice input (410), such as by performing a speech-recognition process on the voice input to produce the voice data. In various embodiments, the SR process is performed by the safety control panel, the building management system, the building safety device, or the individual's mobile device, which includes transmitting the voice input between devices as necessary, so that the building management system receives the voice data. For example, in one embodiment, the voice recognition circuit 331 of the building safety device 300 having the microphone 304 that receives the voice input from an individual within the predetermined distance of the building safety device 300 next performs the speech recognition or SR process on the received voice input to produce corresponding voice data for further processing locally at the building safety device 300 or transmittal to the safety control panel or the building management system for further processing. When performing the SR process on the received voice input, the system my detect a distress sound by comparing the voice data produced from the voice input to a known user voice pattern (e.g., pattern 313a) that the system recognizes as a "scream" pattern from an individual. Similarly, when performing the SR process on the received voice input, the system may detect a distress word by comparing the voice data to a library of known distress words or patterns 313 corresponding to known distress words in known languages that are stored in the safety control panel, the building management system, or applicable building safety device that received the voice input, such as "help", "fire", "smoke", "earthquake", "terrorist," "attack", etc.

The system can optionally determine whether the voice data corresponds to an authorized user (415). Again, this determination can be performed by the safety control panel, the building management system, the building safety device, or the individual's mobile device, which includes transmitting the voice data between devices as necessary. This determination can be performed, for example, by comparing the voice input or voice data to stored voice samples or patterns or stored voice data of authorized users or predetermined keywords. In one embodiment, user voice samples or patterns 313a-313n may be received by the system from respective individuals that have used an application on their mobile device 120 (e.g., such as Apple's Siri voice activated app) to capture their voice pattern and submit their captured voice pattern to the system (e.g., to the fire control panel or management monitoring system hosting the emergency safety application 228, or the secondary communication interface 314 of the applicable building safety device 300).

The system can determine the location of the individual (420). Using any of the techniques described herein, the system determines the location of the individual in the building or relative to the nearest building safety device. For example, if the person needs to reach a pull station or exit, the system can use sensors 330 to derive the location of the user relative to the building safety device and then provide an audible response to guide the user to the device or exit as described below.

The system determines a response to the voice input (425). The response can include an audible response produced by the system, a visual response produced by the system, activation of an alarm condition, contacting emergency personnel, or some combination of these. Determining the response can be based on the determination of whether the voice sample, pattern, or data corresponds to an authorized user, as the response can differ depending on if it was made by an authorized user. Determining the response is based on the voice data; that is, the recognized speech can be a request for directions to a pull station, a command to sound an alarm, a distress sound, a distress word, or otherwise.

In one example, the response is an audible response, by a building safety device, directing the individual to a pull station. In another example, particularly where the individual is an authorized user, the response can include activating an alarm condition, notifying emergency personnel, and performing other functions that might otherwise require a physical activation of a manual pull station.

In embodiments where the voice input is received by the mobile device, the voice input and voice data are transmitted by the mobile device to the remainder of the building safety system for the response to be produced. Note that the form of the voice input may or may not be specifically required; that is, in some embodiments, specific key words or commands may be required, while in other cases the voice input is parsed to determine its nature, e.g., if it is a request for the location of a pull station, a request to sound an alarm, or otherwise.

In embodiments where an initial voice input and corresponding voice data is recognized by the system as a distress sound (such a "scream") or a distress word (such a "Fire") from an authorized user, the system may determine that there is an emergency event and immediately produce a response, such as activating an alarm condition in the building and/or notifying emergency personnel.

In other embodiments, the system recognizes the initial voice input and corresponding voice data as a distress sound or as a distress word from an unauthorized user. In these embodiments, the system recognizes that the initial voice input/data does not correspond to a voice sample or pattern stored by the system to determine that the distress sound or the distress word is not from an authorized user. In such embodiments, the system may provide a verbal response via a speaker 306 of the building safety device 300 closest to the location of the user or individual that provided the initial voice input. The verbal response may be a phrase to prompt the user or individual to confirm an emergency event is occurring. (e.g., "Do you need to activate fire alarms in your area?" or "Do you need emergency personnel at your current location?" or "Do you need assistance in locating an emergency exit?" The system may subsequently wait for a second voice input at 405 before continuing processing, as indicated by loop 435.

The system may then produce the response to the voice input (430). In some embodiments, this action or step by the system can include transmitting a response to the mobile device so that the mobile device presents the response to the individual. The process can return to detecting voice inputs at 405, as indicated by loop 440.

Figure 5:
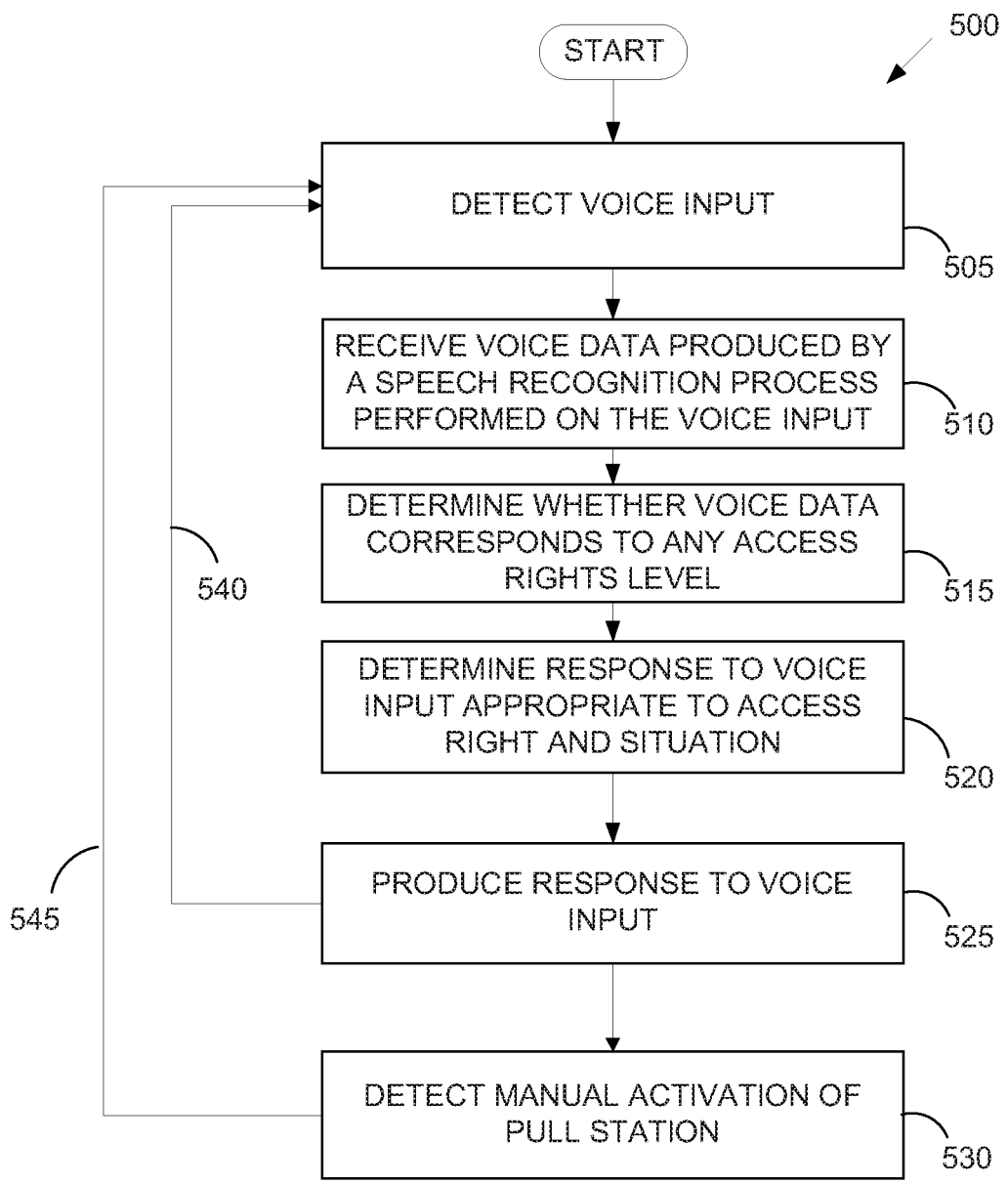
FIG. 5 illustrates a flowchart of another process in accordance with disclosed embodiments.

FIG. 5 depicts a flowchart of a process 500 in accordance with disclosed embodiments. This process may be performed, for example, by one or more building safety systems, such as building safety system 100, one or more building safety devices such as building safety device 300, or one or more data processing systems, such as, for example, the data processing system 200, configured to perform acts described below, a mobile device, any of which, or any combination of which, are referred to in the singular as "the system." The process may be implemented by executable instructions stored in a non-transitory computer-readable medium that cause one or more elements of the system to perform such a process. For example, the emergency safety application 228 may comprise the executable instructions to cause one or more data processing systems to perform such a process.

The process begins with the system detecting a voice input from an individual (505). In various embodiments, the voice input is received by the microphone 304 with interface with the voice recognition circuit (331) of a building safety device 300. In other embodiments, the voice input can be received by the individual's mobile device. The voice input can be, for example, a request for directions to a pull station, a command to activate an alarm, a distress sound, a distress word, or otherwise.

The system receives voice data produced by a speech recognition process performed on the voice input (510), such as by performing a speech-recognition process on the voice input to produce the voice data. In various embodiments, the SR process is performed by the safety control panel, the building management system, the building safety device, or the individual's mobile device, which includes transmitting the voice input between devices as necessary, so that the building management system receives the voice data. For example, in one embodiment, the voice recognition circuit 331 of the building safety device 300 having the microphone 304 that receives the voice input from an individual within the predetermined distance of the building safety device 300 next performs the speech recognition process on the received voice input to produce corresponding voice data for further processing locally at the building safety device 300 or transmittal to the safety control panel or the building management system for further processing.

The system can optionally determine whether the voice data corresponds to any access rights level (515). Again, this determination can be performed by the safety control panel, the building management system, the building safety device, or the individual's mobile device, which includes transmitting the voice data between devices as necessary. This determination can be performed, for example, by comparing the voice input or voice data to stored voice samples or patterns or stored voice data of authorized users or predetermined keywords. An access rights level can be for example, a public user, an employee of a facility, emergency personnel, or otherwise. The access rights level can be determined, for example, by keywords or passphrases (or lack of them) in the voice input or voice data.

The system determines a response to the voice input that is appropriate to the corresponding access rights level or situation (520). The response can include an audible response produced by the system, a visual response produced by the system, activation of an alarm condition, contacting emergency personnel, some combination of these, or otherwise. Determining the response is based on the voice data; that is, the recognized speech can be a request for directions to a pull station, a command to sound an alarm, or otherwise. In one example, the response is an audible response, by a building safety device, directing the individual to a pull station. The response appropriate to an access right level can include ignoring the voice input (for example, if a public user says "fire" but does not have rights to activate a fire alarm by speaking, directing the user to a pull station (for example, if a public user says "fire alarm" or "pull station"), or otherwise. In another example, particularly where the individual has a "higher" access rights level, the response can include activating an alarm condition, notifying emergency personnel, and performing other functions that might otherwise require a physical activation of a manual pull station. In embodiments where the voice input is received by the mobile device, the voice input and voice data are transmitted by the mobile device to the remainder of the building safety system for the response to be produced. Note that the form of the voice input may or may not be specifically required; that is, in some embodiments, specific key words or commands may be required, while in other cases the voice input is parsed to determine its nature, e.g., if it is a request for the location of a pull station, a request to sound an alarm, or otherwise.

The system produces the response to the voice input (525). In some embodiments, this can include transmitting a response to the mobile device so that the mobile device presents the responds to the individual. The response can be an audible response as described herein, such as directions to the nearest pull station or exit. In some cases, the system can also temporarily silence other alarms in the vicinity so that a visually-impaired individual can hear the audible response and directions, and reactivate the other alarms when the visually-impaired individual has exited the area or reached the pull station. The process can return to detecting voice inputs at 505, as indicated by loop 540.

The system can detect a manual activation of a pull station (530), and produce an appropriate response such as activating an emergency condition, sounding an alarm, notifying authorities, or otherwise. Again, the process can return to detecting voice inputs at 505, as indicated by loop 545.

Disclosed embodiments provide distinct technical advantages over present systems. In particular, disclosed embodiments enable the visually impaired to speak their need for a pull station or to sound an alarm, and the building safety system automatically responds appropriately, sounding an alarm, directing the individual to a pull station or exit, or other audible or visual response.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method performed by a building safety system having at least a processor, the method comprising:
   by the building safety system:
      receiving a voice data relating to a noise produced from an individual, the voice data produced by a speech recognition process performed on the noise, wherein the noise is a first voice input;
      determining whether the noise corresponds to an authorized individual;
      determining a presence and direction of movement of the individual;
      activating an alarm condition and producing a directional response based on the noise in response to determining that the noise corresponds to the authorized individual, wherein the directional response is based on the presence and direction of movement of the individual, effective to direct the individual to a further location;
      prompting the individual to confirm that an emergency event is occurring in response to determining that the noise does not correspond to any authorized individual;
      receiving a second voice input in response to prompting the individual; and
      producing a directional response based on the second voice input in response to receiving the second voice input.

2. The method of claim 1,
   wherein the building safety system comprises a location sensor effective for the determining the presence of the individual and for determining a direction of movement of the individual.

3. The method of claim 2,
   wherein the location sensor comprises a device selected from the group consisting of infrared detector or array, heat detector or array, camera, motion sensor, microphone, ultrasonic ranging module, a sonic rangefinder, laser rangefinder, radar distance measurement, pulse repetition frequency devices, GPS devices and wireless device.

4. The method of claim 2, comprising
the building safety system selecting the further location based on the noise.

5. The method of claim 4,
wherein the building safety system comprises a plurality of building safety devices each having a speaker, and
wherein the directional response is an audible response via the speaker comprised of a first of the plurality of building safety devices.

6. The method of claim 2,
wherein the further location is an exit.

7. The method of claim 6, comprising
wherein the building safety system comprises a storage of plurality of voice patterns, and
wherein the building safety system determines when the noise corresponds to the authorized individual based on the stored voice patterns.

8. The method of claim 1,
wherein the speech recognition is performed by a mobile device.

9. The method of claim 1,
wherein the speech recognition is performed by the building safety system.

10. The method of claim 9,
wherein the building safety system has a plurality of building safety devices, each having a microphone, the noise is received by a first of the plurality of building safety devices, and the speech recognition process is performed by a safety control panel in communication with the first of the plurality of building safety devices.

11. The method of claim 1,
determining the noise is a request for directions to a pull station, a distress sound, or a distress word.

12. The method of claim 11,
activating a notification device controlled by the building safety system to signal an alarm in response to determining the noise is directions to a pull station, a distress sound, or a distress word.

13. The method of claim 11,
wherein the building safety system comprises a plurality of building safety devices each having a speaker, and
after determining the noise is a distress sound or a distress word, the building safety system produces an audible prompt for the individual to confirm an emergency event is occurring.

14. The method of claim 1,
wherein the noise is received by a building safety device,
wherein the building safety device is selected from the group consisting of pull station, smoke detector, heat detector, notification device, emergency light, exit sign, and public-address speaker.

15. The method of claim 1,
wherein the directional response is produced a building safety device,
wherein the building safety device is selected from the group consisting of pull station, smoke detector, heat detector, notification device, emergency light, exit sign, and public-address speaker.

16. The method of claim 1, further comprising:
silencing at least one alarm in a vicinity of the individual other than the directional response; and
reactivating the at least one alarm when the individual has exited the vicinity or reached a building safety device.

17. A building safety system, comprising:
a safety control panel; and
a plurality of building safety devices in communication with the safety control panel, the building safety system configured to:
receive voice data relating to a noise produced from an individual, the voice data produced by a speech recognition process performed on the noise, wherein the noise is a first voice input;
determine whether the noise corresponds to an authorized individual;
determine a presence and direction of movement of the individual;
activate an alarm condition and produce a directional response based on the noise in response to determining that the noise corresponds to the authorized individual, wherein the directional response is based on the presence and direction of movement of the individual, effective to direct the individual to a further location;
prompt the individual to confirm that an emergency event is occurring in response to determining that the noise does not correspond to any authorized individual;
receive a second voice input in response to prompting the individual; and
produce a directional response based on the second voice input in response to receiving the second voice input.

18. The building safety system of claim 17,
each of the plurality of building safety devices comprises a location sensor effective for the determining the presence of the individual and for determining a direction of movement of the individual.

19. The building safety system of claim 18,
wherein the location sensor comprises a device is selected from the group consisting of infrared detector or array, heat detector or array, camera, motion sensor, microphone, ultrasonic ranging module, a sonic rangefinder, laser rangefinder, radar distance measurement, pulse repetition frequency devices, GPS devices and wireless device.

20. The building safety system of claim 18,
wherein the building safety system comprises a plurality of building safety devices each having a speaker, and
wherein the directional response is an audible response via the speaker included in a first of the plurality of building safety devices.

* * * * *